United States Patent
Iso-Heiko et al.

(10) Patent No.: US 7,324,002 B2
(45) Date of Patent: Jan. 29, 2008

(54) OUTDOOR COMPUTER

(75) Inventors: Jari Iso-Heiko, Vantaa (FI); Tapio Savolainen, Helsinki (FI); Terho Lahtinen, Helsinki (FI)

(73) Assignee: Suunto Oy, Vantaa (FI)

( * ) Notice: Subject to any disclaimer, the term of this patent is extended or adjusted under 35 U.S.C. 154(b) by 252 days.

(21) Appl. No.: 11/012,219

(22) Filed: Dec. 16, 2004

(65) Prior Publication Data
US 2005/0134467 A1 Jun. 23, 2005

(30) Foreign Application Priority Data
Dec. 19, 2003 (FI) .................................. 20031874

(51) Int. Cl.
*G01W 1/00* (2006.01)
(52) U.S. Cl. ............ 340/601; 340/539.22; 340/539.28; 340/968; 340/970
(58) Field of Classification Search ................ 340/601, 340/988, 970, 977, 539.28, 539.22, 614, 340/968
See application file for complete search history.

(56) References Cited
U.S. PATENT DOCUMENTS 6,013,007 A * 1/2000 Root et al. ...................... 482/8
6,032,108 A * 2/2000 Seiple et al. .................. 702/97
6,310,554 B1 10/2001 Carrell
6,381,540 B1 4/2002 Beason et al.
6,434,485 B1 8/2002 Beason et al.
6,522,298 B1 2/2003 Burgett et al.
6,529,827 B1 3/2003 Beason et al.
6,703,945 B2 * 3/2004 Kuntman et al. ........... 340/961

FOREIGN PATENT DOCUMENTS

DE 200 03 823 U1 9/2000
JP 9-61269A A 3/1997

* cited by examiner

*Primary Examiner*—Davetta W. Goins
(74) *Attorney, Agent, or Firm*—Birch, Stewart, Kolasch & Birch, LLP

(57) ABSTRACT

A method for implementing a weather alarm in an outdoor computer includes defining atmospheric-pressure data repeatedly, defining altitude data repeatedly and essentially simultaneously with the atmospheric-pressure data, with the aid of a satellite positioning system, and converting both measured variables into the same measurement unit, either pressure or altitude. The difference between the converted variables is determined and is stored as a reference value, the difference between the converted variables is repeatedly monitored, and when the difference changes by more than a preset limit-value relative to the reference value, a weather alarm is given. Also an apparatus for performing the method.

18 Claims, 2 Drawing Sheets

OUTDOOR COMPUTER

FIELD OF THE INVENTION

The present invention relates to a method and apparatus, for implementing a weather alarm in an outdoor computer.

BACKGROUND OF THE INVENTION

According to the state of the art, in outdoor computers, for example, wristop computers, equipped with barometers, weather alarms are used by indicating rapid variations in pressure.

A drawback of the state of the art is that variations in pressure are also caused by changes in the altitude of the user of the device. Thus, in order to avoid unnecessary alarms, it has been possible to use the weather alarm only when the user remains at a constant altitude. Thus, during a hike over ground with a varying elevation profile, devices according to the prior art would give many false alarms, because the changes in atmospheric pressure due to vertical movements are typically so much greater than the differences in atmospheric pressure caused by weather changes that a change in weather will be obscured beneath the pressure changes due to altitude. The alarm condition will be thus met due to a change in altitude. In practice, it has not been possible to implement a device giving a good weather alarm by applying existing knowledge.

Various methods for measuring pressure, based on calibrating an altitude definition with the aid of map data or GPS data, are known from U.S. Pat. Nos. 6,529,827, 6,434,485, and 6,381,540.

The GPS system is mainly intended for positioning that takes place at ground level, in a two-dimensional space. However, if the GPS device can contact at least four satellites, altitude data can also be defined, in among other ways, the manners disclosed in the aforementioned U.S. patents. Because altitude data (vertical data) is not actually a basic property of the OPS system, the definition of a vertical position using the GPS system is both slow and inaccurate, compared to the same system's accuracy and speed of definition of horizontal data.

SUMMARY OF THE INVENTION

The invention is intended to eliminate the defects of the state of the art disclosed above and for this purpose create an entirely new type of method and apparatus for implementing weather alarms in an outdoor computer.

The invention is based on defining, with the aid of altitude data defined from the GPS system or other satellite positioning system, a reference value for the pressure-measurement side, and comparing the calculated pressure value based on the GPS altitude data and the value obtained from the pressure measurement with each other, and when the change in the difference between these values exceeds a predefined threshold value, giving a weather alarm.

Considerable advantages are gained with the aid of the invention.

With the aid of the invention, the weather-alarm functionality can be kept in operation the whole time, thus improving the safety of hikers and others outdoors.

Thanks to the continuous operation of the weather alarm, hiking, sports, and other recreations taking place over ground with a varying height profile can be made safer, as far as changes in weather conditions are concerned. Those outdoors can receive, in addition to storm forecasts, additional information of an improvement in the weather and thus alter their route plans on the basis of a positive forecast.

In the following, the invention is examined with the aid of examples and with reference to the accompanying drawings.

DETAILED DESCRIPTION

The altitude data can be calculated, for example, according to the following equations 1 or 2 according to the prior art, or with the aid of a table based on practical data.

The pressure can be corresponding determined form the altitude data, with the aid of equation 2 calculated from equation $$H_B = \frac{T_0}{L}\left[\left(\frac{P_L}{P_B}\right)^{\frac{-RL}{g}} - 1\right] \quad (1)$$

$$P_L = P_B\left(1 + \frac{LH_B}{T_0}\right)^{\frac{g}{RL}} \quad (2)$$

Figure 1:
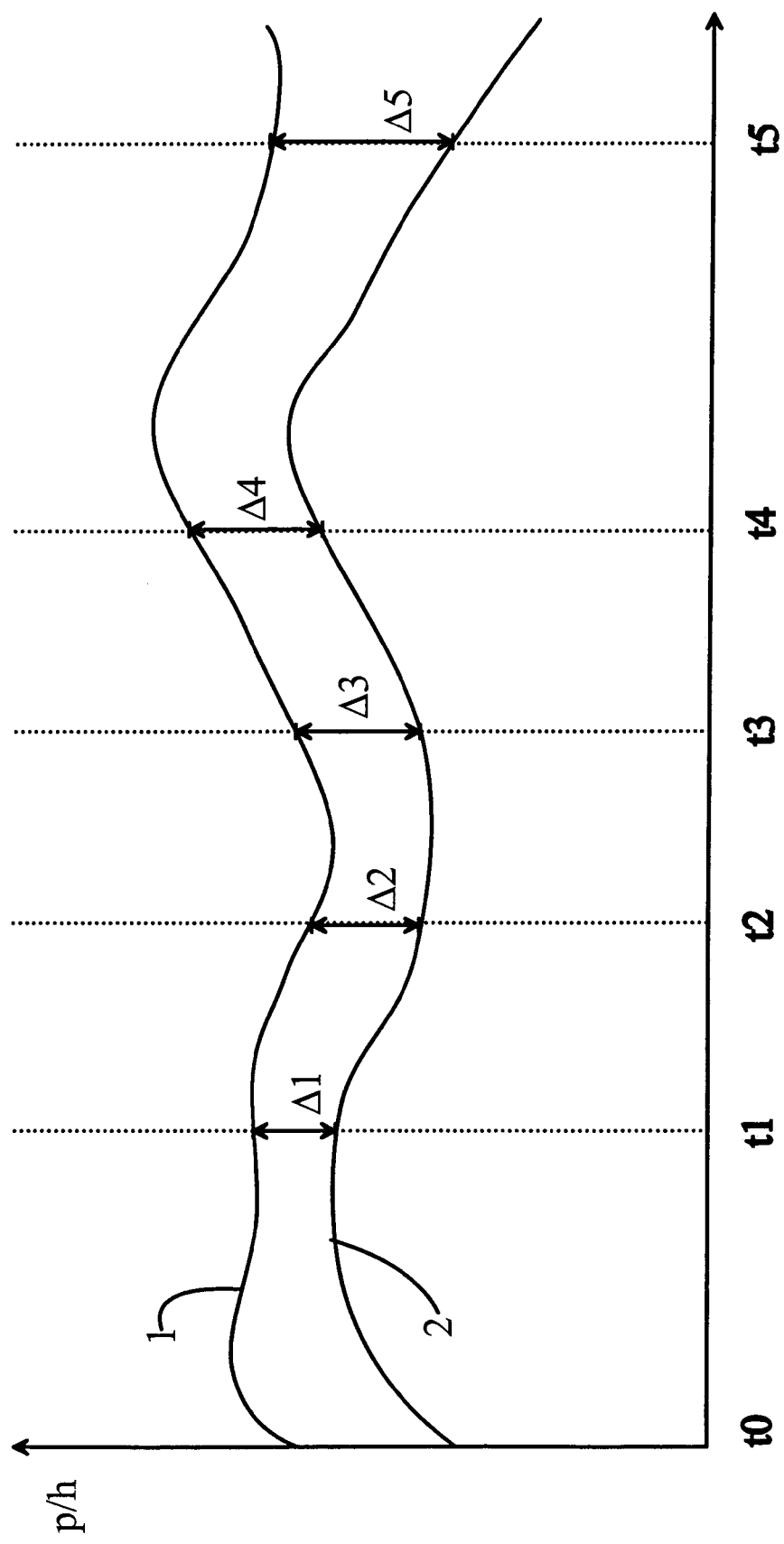
FIG. 1 shows graphically one measurement event according to the invention.

The symbols of the equations are as follows:
$T_0$=standard temperature at sea level
L=vertical temperature gradient
R=gas constant
g=acceleration of gravity
$P_L$=local pressure
$P_B$=basic pressure (pressure at sea level)
$H_g$=local pressure height FIG. 1 shows pressure data 1 calculated from the GPS altitude data and pressure data 2 from the pressure sensor as a function of time. Thus, in the method according to the invention, two variables are formed in parallel and essentially simultaneously, position data 1, based on OPS altitude date or on other satellite positioning data, with the aid of a GPS apparatus or similar satellite positioning equipment, and, in parallel with this, pressure data 2 from the pressure-measurement sensor. Alternatively, corresponding data are formed, by changing the pressure data 2 into altitude data, for example, with the aid of equation 1, and the sets of altitude data formed in two independent manners are compared with each other.

The GPS altitude data is formed, in a manner known to one versed in the art, by using, for example, the methods disclosed in the aforementioned U.S. Pat. Nos. 6,529,827, 6,522,298, 6,434,485, and 6,381,540.

According to one preferred embodiment of the invention, the GPS altitude data, or other satellite positioning data is converted into pressure data according to FIG. 1, for example, with the aid of equation 2. At a moment in time t0, a calibration period of the GPS signal 1 is started, which lasts until the moment t1. Using existing technology, the calibration period will be about 5-15 minutes. Using existing technology, a calibration period is required, because the definition of the altitude data using OPS technology is somewhat imprecise and requires erroneous satellite information to be filtered out for a specific period of time, in order to achieve a correct final result. After calibration, at moment t1 the difference Δ1 between the signals 1 and 2 is defined, either as altitude or pressure data and this data is stored in the memory of the system.

The difference Δ between the signals 1 and 2 is repeatedly defined at the moments t2-t5 and, if the change in the difference ΔN relative to the value Δ1 exceeds, or is less than a preset limit, a weather alarm is given, for example, as a sound, light, or vibration alarm in the outdoor computer. In other words an alarm is given if ΔN fulfills a predetermined condition. The alarm can also appear on the display as text, or as some other symbol. When using a pressure value, 4 hPa, for example, can be regarded as the alarm limit, in other words, if any change (rise or drop) in the measurement value Δ2-Δ5, relative to the reference value Δ1 exceeds the pressure value 4 hPa within a defined period of time, alarm is given. ±30 metres can be regarded as the corresponding limit in altitude measurement. The moments of time t2-t5 referred to are optional, at the moment the measurement is made at intervals of about 15 minutes and the 4 hPa change must take place over a period of less than three hours, otherwise no alarm is given. The comparison is thus made retroactively. In other words, using the limit values referred to above, a change of 4 hPA over ten hours will not require an alarm to be given, as it is only a normal slow change in the weather.

In other words, a reference value Δ1 is defined for the difference between the measurement data 1 and 2, a change limit d is defined, which can be positive or negative, in which case the alarm limit values will be Δ1−d and Δ1+d. These values can be considered as either a pressure or an altitude. The change limit d can differ in magnitude in the positive and negative directions and, if necessary, can be set by the user in different altitude and weather situations. If, in a particular environment or weather condition, any change in weather can lead to real danger, the sensitivity of the alarm can be increased, if necessary.

If conversion of the pressure data 2 is used to form the altitude data 1, the nonlinearity of the equation 1 and 2 can be taken into account when defining the alarm limit, in other words, the alarm limit in metres can depend on the measured altitude measured.

It should be noted, that, in the method according to the invention, the pressure data 2 of moment t1 may be arbitrary, the variable monitored being the change in the difference between the signals 1 and 2, more specifically the exceeding of a predefined limit value.

Figure 2:
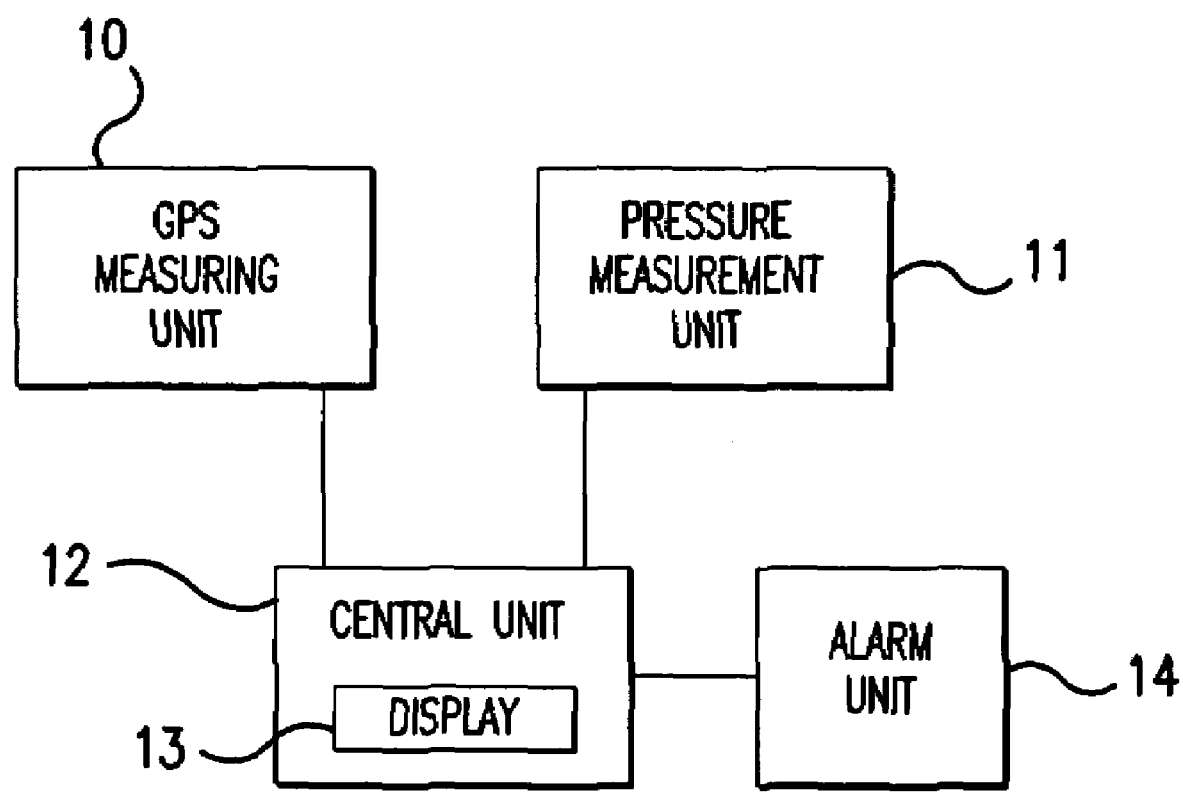
FIG. 2 shows a block diagram of one embodiment according to the invention.

According to FIG. 2, the system includes a OPS measuring unit 10, by means of which the GPS measuring data is received and preprocessed. Further processing of the GPS signals, such as the conversion into pressure, takes place in the central unit 12. A pressure-measurement unit 11, which if necessary also participates in the preliminary calculation of the pressure signal, is also connected to the central unit 12. The final processing of the pressure data and changes in variable take place typically in the central unit 12, which if necessary includes a display 13. An alarm unit 14 connected to the central unit takes care of transmitting the weather alarm to the user. The unit 14 can be, for example, a vibrating alarm or loudspeaker. The display 13 can also be used to transmit the alarm to the user, for example, by a backlight and/or information text, or by showing a suitable symbol on the display.

More generally, the task of the central unit 12 is to take care of the calculation and the storage of data, as well as controlling the peripheral devices 10, 11, 13, and 14.

In principle, the solution according to the invention can also be implemented in such a way that, in addition to the pressure measurement, the altitude data is measured using some other independent method, which is not dependent on the prevailing atmospheric pressure, and is continuously compared with the difference between the air pressure and the calculated pressure data obtained from the altitude. When the specific value of the difference exceeds a predefined limit value, a weather alarm is given.

The pressure data 2 and the GPS altitude data are measured essentially simultaneously and continuously. In practice, this means at least several pressure and altitude measurements each minute as a repeated process.

In this connection, the term outdoor computer refers to all computers suitable for user outdoors. According to the state of the art at the present moment an outdoor computer is typically a wristop computer, or a so-called palm computer, or a normal portable computer, or a computer based on a GPS device.

The invention claimed is:

1. A method for implementing a weather alarm in an outdoor computer, in which method
   atmospheric-pressure data is defined repeatedly,
   altitude data is defined repeatedly and essentially simultaneously with the atmospheric-pressure data, with the aid of a satellite positioning system, and both measured variables are converted into the same measurement unit, either pressure or altitude,
characterized in that
   the difference between the converted variables is determined and is stored as a reference value,
   the difference between the converted variables is repeatedly monitored, and
   when the difference changes by more than a preset limit-value relative to the reference value, a weather alarm is given.

2. A method according to claim 1, characterized in that the variable used is pressure.

3. A method according to claim 1, characterized in that the variable used is altitude.

4. A method according to any of the above claims, characterized in that the value ±4 hPa over a three-hour estimating period is used as the change limit-value in the pressure comparison.

5. A method according to any of claims 1-3, characterized in that the value ±30 m over a three-hour estimating period is used as the change limit-value in the altitude comparison.

6. An apparatus for implementing a weather alarm in an outdoor computer, which apparatus includes
   measuring means for repeatedly determining the atmospheric-pressure data,
   means for determining the altitude data repeatedly and essentially simultaneously with the atmospheric-pressure data, with the aid of a satellite positioning system, and
   conversion means for converting both measured variables into the same measurement unit, either pressure or altitude,
characterized in that the apparatus includes
   means for determining the difference between the converted variables and
   storing means for storing the difference as a reference value,
   monitoring means for monitoring the difference of the converted variables, and
   alarm means for giving an alarm if the difference changes by more than the preset limit-value relative to the reference value.

7. An apparatus according to claim 6, characterized in that the alarm means is a vibrating element, which is able to give an acoustic or vibration alarm.

8. An apparatus according to claim 6, characterized in that the alarm means is a light source with a varying lighting effect.

9. An apparatus according to claim 6, characterized in that the alarm means is text or a symbol on the display.

10. A method for implementing a weather alarm in an outdoor computer comprising the steps of:
   determining first data comprising a first one of atmospheric pressure data and altitude data at a time t1 and at a first plurality of times after time t1, the first data being expressed in first units;
   determining second data comprising the other one of atmospheric pressure data and altitude data at time t1 and at a second plurality of times after time t1, the second plurality of times corresponding to the first plurality of times, the second data being expressed in second units;
   said step of determining first data or said step of determining second data comprising a step of obtaining data from a satellite position measurement system;
   converting the second data into first units;
   determining and storing a difference between the first data and the converted second data at t1 as a reference value;
   setting a limit-value based on the reference value;
   monitoring a difference between the first data and the converted second data at the second plurality of times; and
   giving a weather alarm when the difference between the first data and converted second data varies from the reference value by more than the limit-value.

11. The method of claim 10 wherein said step of giving a weather alarm comprises the step of giving a weather alarm only when the difference between the first data and converted second data varies from the reference value by more than the limit-value over a given estimating period.

12. The method of claim 10 wherein said step of giving a weather alarm comprises the step of giving a weather alarm when the difference between the first data and converted second data varies from the reference value by more than +/−4 hPa over a three hour period.

13. The method of claim 10 wherein said step of giving a weather alarm comprises the step of giving a weather alarm when the difference between the first data and converted second data varies by more than +/−30 m over a three hour period.

14. The method of claim 10 wherein said step of giving a weather alarm when the difference between the first data and converted second data varies from the reference value by more than the limit-value comprises the steps of giving a weather alarm when the difference between the first data and converted second data is greater than the reference value by more than the limit-value and giving a weather alarm when the difference between the first data and converted second data is less than the reference value by more than the limit-value.

15. An apparatus for implementing a weather alarm in an outdoor computer comprising:
   first determining means for determining first data comprising a first one of atmospheric pressure data and altitude data at a time t1 and at a first plurality of times after time t1, the first data being expressed in first units;
   second determining means for determining second data comprising the other one of atmospheric pressure data and altitude data at time t1 and at a second plurality of times after time t1, the second plurality of times corresponding to the first plurality of times, the second data being expressed in second units;
   one of said first determining means and said second determining means comprising a satellite position measurement system;
   converting means for converting the second data into first units;
   third means for determining and storing a difference between the first data and the converted second data at time t1 as a reference value;
   monitoring means for monitoring a difference between the first data and the converted second data at the second plurality of times;
   limiting means for setting a limit-value based on the reference value; and
   alarm means for giving a weather alarm when the difference between the first data and converted second data varies from the reference value by more than the limit-value.

16. The apparatus of claim 15 wherein said alarm means gives a weather alarm only when the difference between the first data and converted second data varies from the reference value by more than the limit-value over a given period of time.

17. The apparatus of claim 15 wherein said alarm means for giving a weather alarm gives a weather alarm when the difference between the first data and converted second data is greater than the reference value by more than the limit-value and when the difference between the first data and converted second data is less than the reference value by more than the limit-value.

18. An apparatus for implementing a weather alarm in an outdoor computer comprising:
   a pressure measurement unit for determining atmospheric pressure data at a time t1 and at a first plurality of times after time t1, the atmospheric pressure data comprising first data expressed in first units;
   a satellite positioning unit for determining altitude data at time t1 and at a second plurality of times after time t1, the second plurality of times corresponding to the first plurality of times, the altitude data comprising second data expressed in second units;
   a memory;
   an alarm; and
   a processor for converting the second data into first units or the first data into second units, determining a difference between the first data and the second data at time t1 as a reference value, storing the reference value in the memory, setting a limit-value based on the reference value, monitoring a difference between the first data and the converted second data at the second plurality of times, and actuating the alarm when the difference between the first data and second data varies from the reference value by more than the limit-value.

* * * * *